United States Patent
Shakil et al.

(10) Patent No.: US 11,768,819 B2
(45) Date of Patent: Sep. 26, 2023

(54) DATA UNBLOCKING IN APPLICATION PLATFORMS

(71) Applicant: SAP SE, Walldorf (DE)

(72) Inventors: Yasra Shakil, Bangalore (IN); Ashish Suri, Bangalore (IN); Veena P, Bangalore (IN); Naved Ahmed, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/679,972

(22) Filed: Feb. 24, 2022

(65) Prior Publication Data

US 2023/0267111 A1 Aug. 24, 2023

(51) Int. Cl.
*G06F 16/23* (2019.01)
*G06F 21/64* (2013.01)
*G06F 21/62* (2013.01)
*G06F 16/27* (2019.01)

(52) U.S. Cl.
CPC ...... *G06F 16/2343* (2019.01); *G06F 16/2365* (2019.01); *G06F 16/27* (2019.01); *G06F 21/6218* (2013.01); *G06F 21/64* (2013.01)

(58) Field of Classification Search
CPC .. G06F 16/2343; G06F 16/27; G06F 16/2365; G06F 21/6218; G06F 21/64
See application file for complete search history.

(56) References Cited

U.S. PATENT DOCUMENTS

| | | | |
|---|---|---|---|
| 2006/0005036 A1* | 1/2006 | Hu | G06F 3/04842 713/182 |
| 2007/0214497 A1* | 9/2007 | Montgomery | G06F 21/6218 726/4 |
| 2013/0047215 A1* | 2/2013 | Radhakrishnan | G06F 21/335 726/4 |
| 2014/0006303 A1* | 1/2014 | Haas | G06Q 10/10 705/345 |
| 2014/0082753 A1* | 3/2014 | Sarferaz | G06Q 10/06 726/30 |
| 2014/0279670 A1* | 9/2014 | Wagner | G06Q 10/107 705/342 |
| 2017/0091479 A1* | 3/2017 | Pluder | G06F 21/6245 |

* cited by examiner

*Primary Examiner* — Jensen Hu
(74) *Attorney, Agent, or Firm* — SCHWEGMAN LUNDBERG & WOESSNER, P.A.

(57) ABSTRACT

Systems, methods, and computer-readable media are disclosed for data unblocking in application platforms. An application platform may comprise a plurality of systems. A system may store data having a residence period. Upon expiration of the residence period, the data may be blocked from further processing. Data which is blocked may need to then be unblocked. Systems may be leading systems or dependent systems. Data unblocking may be triggered from the leading system to the dependent systems. At runtime, the dependent system may receive a trust token which may be used to verify a calling system as the leading system. If a data unblocking request is called from a dependent system, data unblocking may be prevented.

17 Claims, 5 Drawing Sheets

DATA UNBLOCKING IN APPLICATION PLATFORMS

TECHNICAL FIELD

Embodiments generally relate to methods of electronic data handling for application platforms. More specifically, embodiments relate to unblocking of data for application platforms having a plurality of systems in an integrated scenario.

RELATED ART

Data privacy and protection has become an important issue for providers of electronic data systems. Recently enacted laws, such as the European Union's General Data Protection Regulation, mandate that electronic data processors provide data blocking of personal data after the expiration of a data residence period. When data is blocked, it is unavailable for further processing or use and inaccessible to normal users. Blocked data may be stored for a further period of time and used for auditing purposes. Thereafter, the blocked data is to be electronically erased in its entirety from digital storage media. Failure to comply with these requirements can result in extensive negative consequences for electronic data processors.

In some cases, blocked data may need to be unblocked. Unblocking of data may be required for various reasons such as incorrect blocking, new processing needs for the blocked data, legal issues, and the like. Typical methods of unblocking data involve manually unblocking data resulting in a high time cost investment. Application platforms may comprise hundreds of systems that must be manually unblocked. Further, complex application platform landscapes lead to myriad difficulties for ensuring all systems in the application platform are correctly evaluated for data unblocking. Accordingly, a need exists for improved data unblocking in application platforms.

SUMMARY

Disclosed embodiments address the above-mentioned problems by providing data unblocking in application platforms. An unblocking request may be received from a user to unblock data for at least one system in an application platform. The application platform may comprise a plurality of systems. Each system may be associated with at least one electronic master data entity. A calling system for the unblocking request may be determined. If the calling system is determined to be a leading system, the unblocking process may proceed. If the calling system is determined to not be a leading system, the unblocking process may be prevented.

Embodiments are directed to one or more non-transitory computer-readable media storing computer-executable instructions that, when executed by a processor, perform a method for data unblocking in application platforms, comprising receiving, from a user, an unblocking request to unblock data for at least one system of a plurality of systems in an application platform, responsive to receiving the unblocking request, determining a calling system associated with the unblocking request, and responsive to determining the calling system is a leading system, triggering unblocking for the at least one system. Each system may be associated with at least one electronic master data entity. Triggering unblocking may comprise resetting a blocking flag indicative that data for the system is unusable for processing.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present teachings will be apparent from the following detailed description of the embodiments and the accompanying drawing figures.

BRIEF DESCRIPTION OF THE DRAWING FIGURES

Embodiments are described in detail below with reference to the attached drawing figures, wherein.

Figure 1:
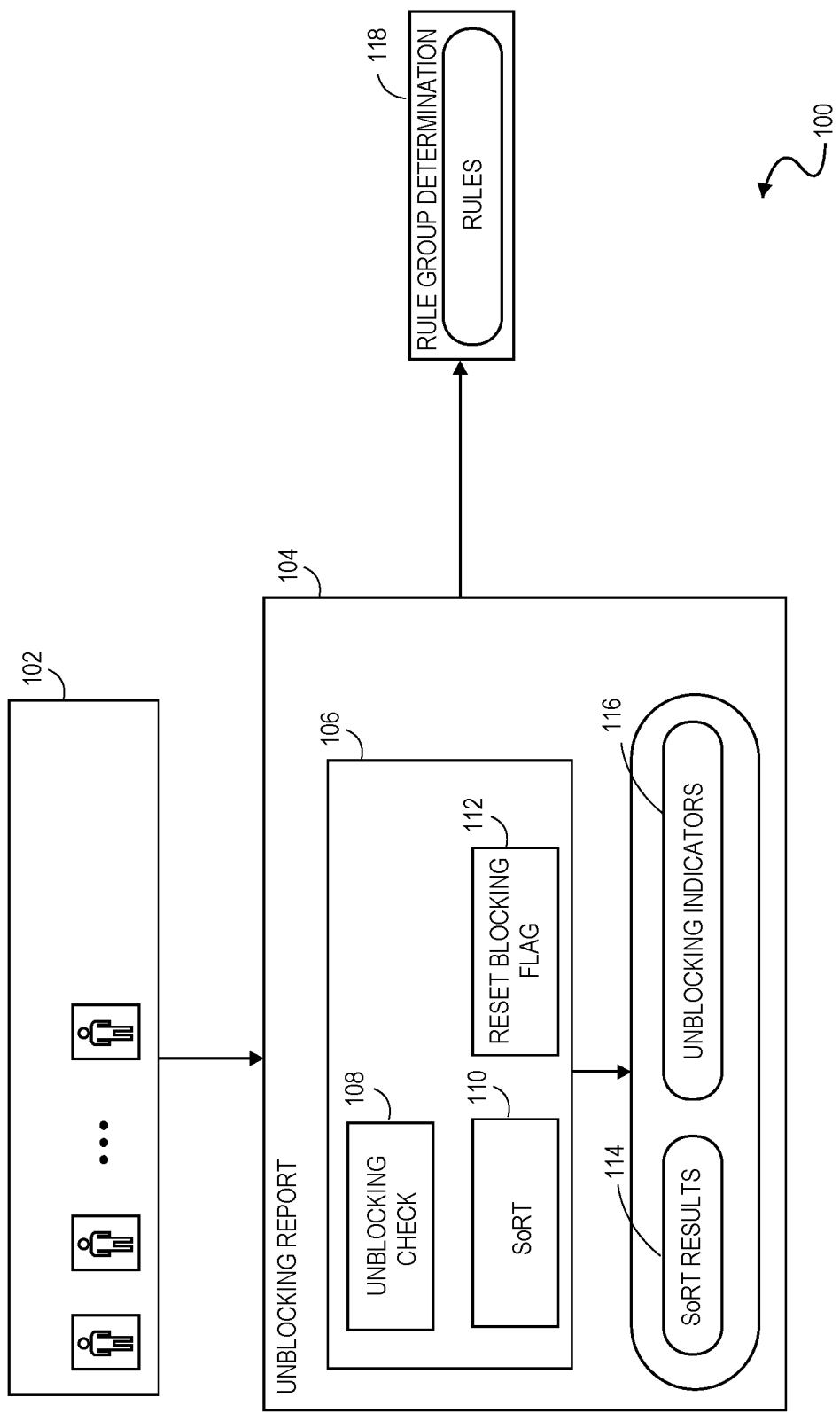
FIG. 1 illustrates an overview of data unblocking for certain embodiments.

The drawing figures do not limit the present teachings to the specific embodiments disclosed and described herein. The drawings are not necessarily to scale, emphasis instead being placed upon clearly illustrating the principles of the disclosure.

DETAILED DESCRIPTION

The subject matter of the present disclosure is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the present claims. Terms should not be interpreted as implying any particular ordering of various steps described unless the order of individual steps is explicitly described.

The following detailed description of embodiments references the accompanying drawings that illustrate specific embodiments in which the present teachings can be practiced. The described embodiments are intended to illustrate aspects of the disclosed embodiments in sufficient detail to enable those skilled in the art to practice the present teachings. Other embodiments can be utilized, and changes can be made without departing from the claimed scope of the claims. The following detailed description is, therefore, not to be taken in a limiting sense. The scope of embodiments is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Systems and methods for data unblocking in application platforms are disclosed herein. Data maintained by an application system may have a residence period during which the data may be used for various processing purposes. Once the residence period expires, the data may transition to a retention period wherein the data remains in the application platform but is to be blocked from further processing. To achieve compliance, such data should be inaccessible (i.e., blocked) to general users while still being accessible for specific use cases (e.g., auditing). Residence periods may vary depending on the type of data and the purpose for the data. For example, an HR department may be required to store an employee's address for three years, while a payroll department may be required to store the address for five years. As such, after three years the data should be blocked for the HR department but not for the payroll department and, after five years, the data should be blocked for the payroll department as well. Data may be blocked within an application platform by preventing the display of the blocked data, preventing modifications to the blocked data, preventing the creation of an object comprising the blocked data, preventing copying or follow-up actions on the blocked data, preventing the searching of the blocked data, or any combination thereof. In some embodiments, users having special authorizations may have read-only access to the blocked data but may be restricted from performing any of the above-described actions on the blocked data. Data may need to be unblocked from a system for various reasons. For example, data that is inadvertently blocked may need to be unblocked because the data is still usable for further processing. As another example, audits or legal requests may require the unblocking of data.

Application platforms may comprise a plurality of systems connected in an integrated scenario. The systems may be enterprise resource planning systems, customer relationship management systems, supplier relationship management systems, or any other data management system and may comprise cloud and/or on-premises systems. Systems may comprise a plurality of applications storing data. Such systems may be characterized as leading systems or dependent systems. Leading systems may comprise one or more electronic master data entities. Dependent systems may comprise replications of the data entities from the leading system. A dependent system may comprise multiple data entities and may comprise data entities having dependencies on one or more different leading systems. Additionally, dependent systems may also comprise leading master data entities having their own dependent systems. The systems may be arranged in an integrated scenario such that a system may be a dependent system of a leading system while also serving as a leading system for other dependent systems. As such, issues may arise when data unblocking previously blocked data in application systems having multiple leading systems due to the relationships between the systems in the integrated scenario.

Application platforms may achieve data unblocking by manually going into each system and submitting an unblocking request. This manual process may require a significant time investment and entail a possibility of introducing errors, such as by systems being missed in the manual unblocking process. To overcome these limitations, systems in the application platform may be categorized into leading systems and dependent systems. As described above, a system may be a leading system of at least one other system while also being a dependent system of a different leading system, for example. An unblocking request may be made from a system, referred to herein as the calling system. If the calling system is determined to be a dependent system, data unblocking may be prevented. If the calling system is determined to be a leading system, data unblocking may if the applications provide a GO Ahead to unblock the master data across all systems.

FIG. 1 illustrates a system overview 100 for data unblocking in application platforms in some embodiments. Users 102 may be administrative users 102 of the application platform having higher privileges than normal users or may be any other type of users. In some embodiments, users 102 are data privacy officers responsible for maintaining the privacy of data and ensuring all legal and corporate rules and regulations are adhered to. Users 102 may administer electronic unblocking report 104 to initiate the data unblocking process. Electronic unblocking report 104 may comprise various processes 106 which may be configured for data unblocking. Processes 106 may comprise an unblocking check 108, start of retention time (SoRT) 110, a reset blocking flag 112, or any combination thereof. Processes 106 may comprise the data unblocking evaluation performed for the application platform. In some embodiments, a system comprises a plurality of applications, and each application may be evaluated for unblocking.

Unblocking check 108 may comprise a test to determine if the data for a system can be unblocked. In some embodiments, unblocking check 108 comprises analyzing the end of purpose for a system. As described above, data may have a defined residence period after which the data is to be blocked. If data was incorrectly blocked before the expiration of the residence period, the data may need to be unblocked. Unblocking check 108 may be configured by user 102 to scan the systems manually, on a periodic basis, or based on any other triggering event. In some embodiments, unblocking check 108 may be configured to scan the systems at differing levels of the application platform. For example, for a hierarchical database system wherein the systems are organized hierarchically with the leading system as a root node/first level of the hierarchy, unblocking check 108 may begin the scan at the third level of the hierarchy and not scan the first and second levels. A hierarchical database system is discussed further below with respect to FIG. 3. Alternatively, or additionally, unblocking check 108 may scan the application platform for specific systems or applications as specified by user 102. Unblocking check 108 may flag any system with blocked data that has not reached the end of the defined residence period. In some embodiments, unblocking check 108 flags any system that will reach the end of the defined residence period prior to the next scheduled unblocking check 108.

Unblocking check 108 may leverage SoRT 110 when determining if a system may be unblocked. SoRT 110 may designate the end of processing for data in a system or an application thereof. For example, the completion of a document may be the end of processing for the data and, as such, the start of retention time 110. SoRT 110 may be stored in a database or table and retrieved by unblocking check 108 when determining if the residence period has expired. In some embodiments, SoRT 110 is sent to the leading system such that the leading system may only unblock data for those dependent systems yet to reach their end of purpose as determined by SoRT 110. For a system that is determined to have an expired residence period, a blocking flag may be set to indicate that the data of the system is unusable for further processing. For a system that is determined to not have an expired residence period, a reset blocking flag 112 may be performed to indicate that the data for the system should be unblocked.

Once processes 106 have been executed and data unblocking is complete, electronic unblocking report 104 may store SoRT results 114 and/or unblocking indicators 116. SoRT results 114 may comprise the SoRT data stored in the database as described above. Unblocking indicators 116 may comprise an indication reset blocking flag 112 was performed and may be stored with SoRT results 114 or separately from SoRT results 114. In some embodiments, unblocking indicators 116 comprise one or more identifiers identifying the leading system.

Electronic unblocking report 104 may also be communicatively coupled to one or more rules engines 118. Rules engine 118 may comprise an API for defining and processing rules. The rules may be implemented as expressions which are assigned to a function. In some embodiments, system groups may be created to facilitate data unblocking in application platforms. System groups may be created based on predefined and/or user-defined rules. Rules may be defined to indicate which system should be a leading system and which systems should be dependent systems thereof. In some embodiments, after designating a system as a leading system, a master data entity is created therefor. Rules may be defined based on various system attributes associated with systems in the application platform. In some embodiments, users 102 create custom code extensions to define rules for rules engine 118.

The systems may comprise system attributes such as an identifier, a category, a data controller, a data origin, a code, and the like. Various other custom attributes may be specified by user 102. System attributes may be dynamic, and the grouping rules may use the system attributes at runtime for generating system groups. In some embodiments, the system category attribute denotes a type of the system. For example, in an order processing database system, the system category may denote whether the system is for an individual, an organization, or a group of organizations or individuals. In some embodiments, the system code attribute may be any predefined (e.g., by the software vendor) or user-defined code for a system. For example, the system code may be a country, a company code, or any other identifier.

In some embodiments, the system data controller attribute indicates a user 102 in charge of said system. Alternatively, or additionally, the system data controller may be an organization in charge of the system. Thus, for example, rules may be created to ensure all systems controlled by a particular data controller are processed for data unblocking. In some embodiments, the system data origin attribute indicates where the data for the system originated. Systems and/or data thereof may be received from various third-party or external sources. Creating a rule such that all systems having data originating from a particular source may allow for incoming data to be checked to ensure the data is available for processing.

Figure 2:
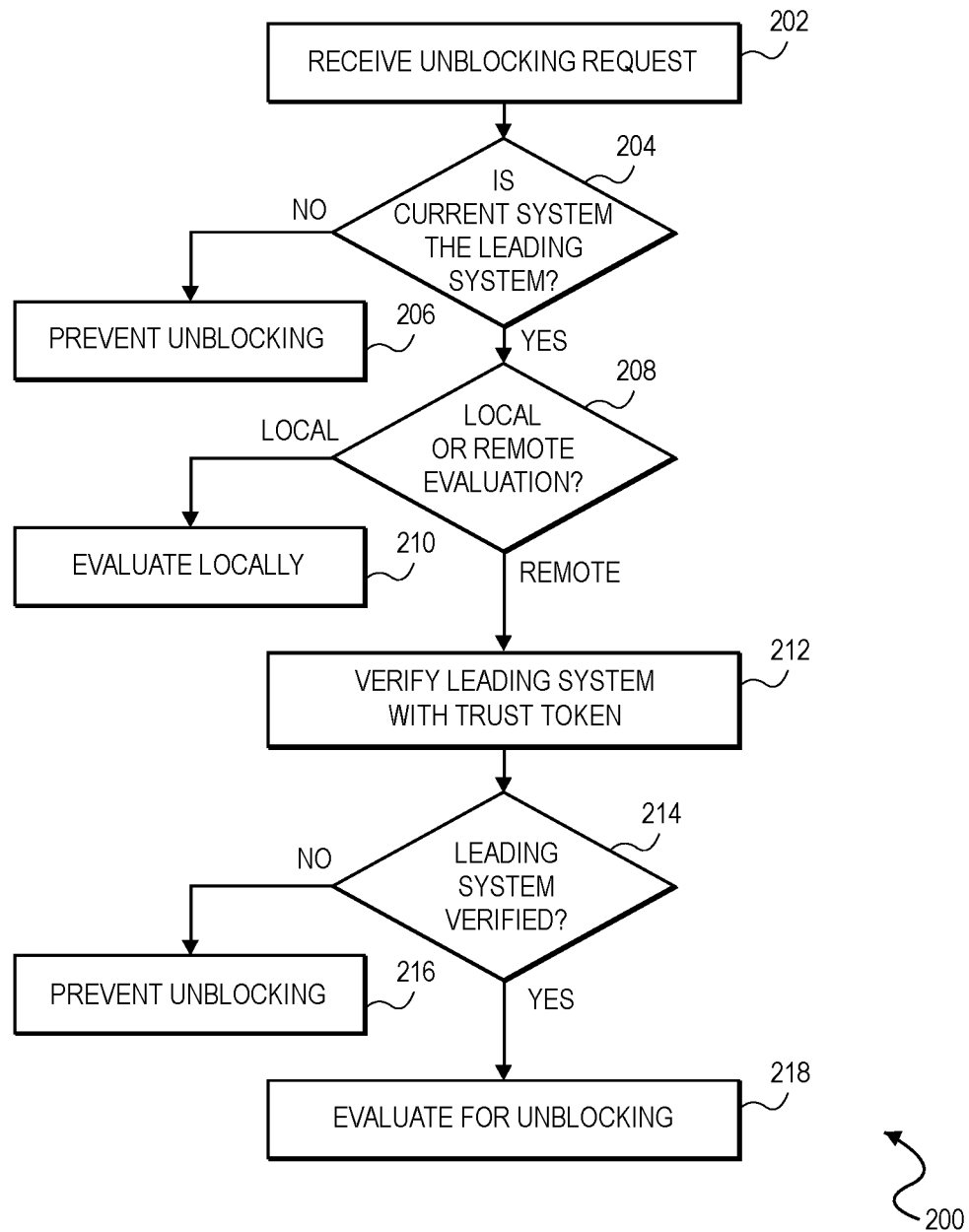
FIG. 2 illustrates an exemplary flow chart for data unblocking from a leading system for some embodiments.

FIG. 2 illustrates an exemplary method 200 for data unblocking from a leading system for some embodiments. In some embodiments, data unblocking may be configured such that unblocking can only be triggered from the leading system. At step 202, an unblocking request may be received. The unblocking request may be received from user 102. In some embodiments, the unblocking request must be authorized by an administrative user with sufficient authorizations before processing is allowed to proceed.

Thereafter, at step 204, it may be determined whether the current system is the leading system. In some embodiments, a connection destination is created in the leading system to the current system. The connection destination may be configured by user 102. The connection destination may comprise the same name as the current logical system. The current system may be the system from which the unblocking request was called from. If the logical system of the leading system matches the logical system of the current system, the current system may be verified as the leading system. If the unblocking request was called from the leading system, processing may proceed to step 208. If the unblocking request was not called from the leading system, processing may proceed to step. At step 206, data unblocking may be prevented because the current system is not the leading system.

At step 208, a determination may be made whether data unblocking is to be evaluated locally or remotely. Local evaluation may comprise a data unblocking evaluation on the leading system. Remote evaluation of data unblocking may comprise evaluating data unblocking for the dependent systems. If the evaluation is local, processing may proceed to step 210, and the data unblocking is evaluated locally. If the evaluation is remote, processing may proceed to step 212.

At step 212, the leading system may be verified with a trust token. The trust token may comprise an authentication measure for validating the triggering system. The authentication measure may be a certificate-based measurement (e.g., TLS) or any other cryptographic technique for securing the communications between the leading system and the dependent system. In some embodiments, an RFC destination is created from a dependent system to the leading system thereof. The RFC destination may define a destination name, the type of connection (e.g., TCP/IP), a description, or any combination thereof. In some embodiments, configuration data is maintained in the dependent system identifying the logical system name of the leading system along with connection information for connecting thereto. In some embodiments, the trust token indicates the leading system of the dependent system. The trust token may be compared with the configuration data identifying the logical system name of the leading system. As such, dependent systems may reject unblocking calls from other dependent systems.

At step 214 it may be determined if the leading system was verified. If the trust token does not verify the correct leading system, processing may proceed to step 216 wherein unblocking for the dependent system may be prevented. If the trust token does verify the correct leading system, processing may proceed to step 218 wherein the dependent system may be evaluated for unblocking.

Embodiments are considered herein wherein data unblocking may be rolled back via data blocking. As described above, data unblocking may be triggered from the leading system to dependent systems. In the event of a failure of a dependent system (e.g., a network failure), blocked data may need to be reverted via data unblocking. In some embodiments, remote system unblocking is performed by contacting remote systems using function calls, TCP/IP, or other data networking protocols. Similarly, unblocked systems may be rolled back to a blocked state by the leading system contacting dependent systems having reached their end of purpose for data blocking.

Figure 3:
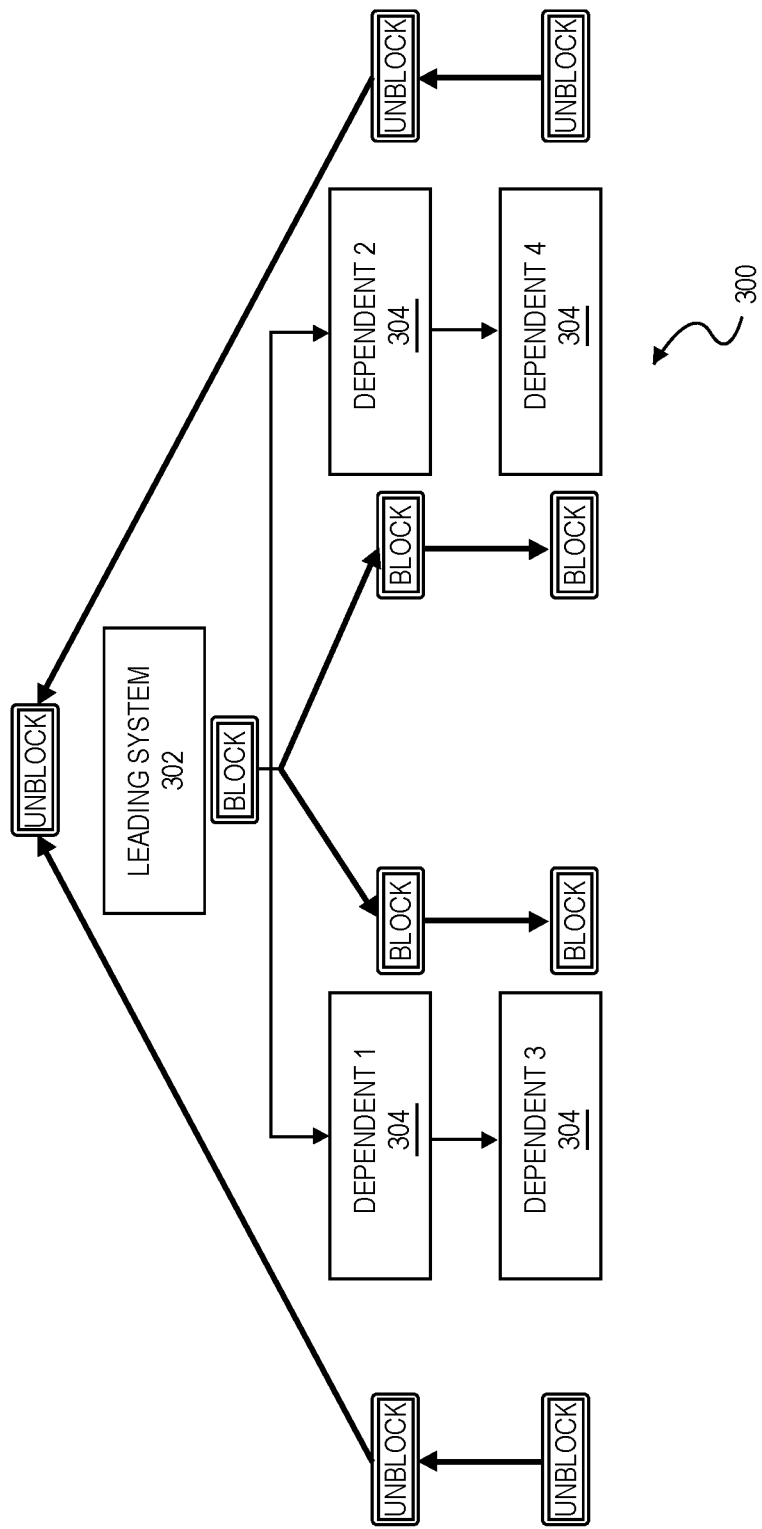
FIG. 3 illustrates an exemplary flow chart for data unblocking at all hierarchical levels of an application platform for some embodiments.

FIG. 3 illustrates a system 300 for data unblocking at all levels of a hierarchical application platform. In some embodiments, application platforms are organized hierarchically wherein a leading system 302 has a plurality of dependent systems 304 as shown. Data blocking in such systems 300 may be performed in a top-down approach, wherein data is blocked from the top of the hierarchy downwards as shown. If a system in the hierarchy is unable to have data blocked therefor, data blocking may be prevented.

When leading system 302 is verified for unblocking, further unblocking requests may be automatically generated for the dependent systems 304 thereof. Unblocking may occur from the top down such that leading system 302 is unblocked first, followed by the dependent systems 304 directly below leading system 302, and so on until the lowest level of the hierarchy has been evaluated for unblocking. If any dependent system 304 in the hierarchy has data which is unable to be unblocked, all systems in the hierarchy may have their data rolled back to a blocked state. In some embodiments, the processes illustrated in system 300 may be carried out subsequent to method 200 such that it is ensured the leading system 302 is verified before a chain of unblocking requests are created.

Figure 4:
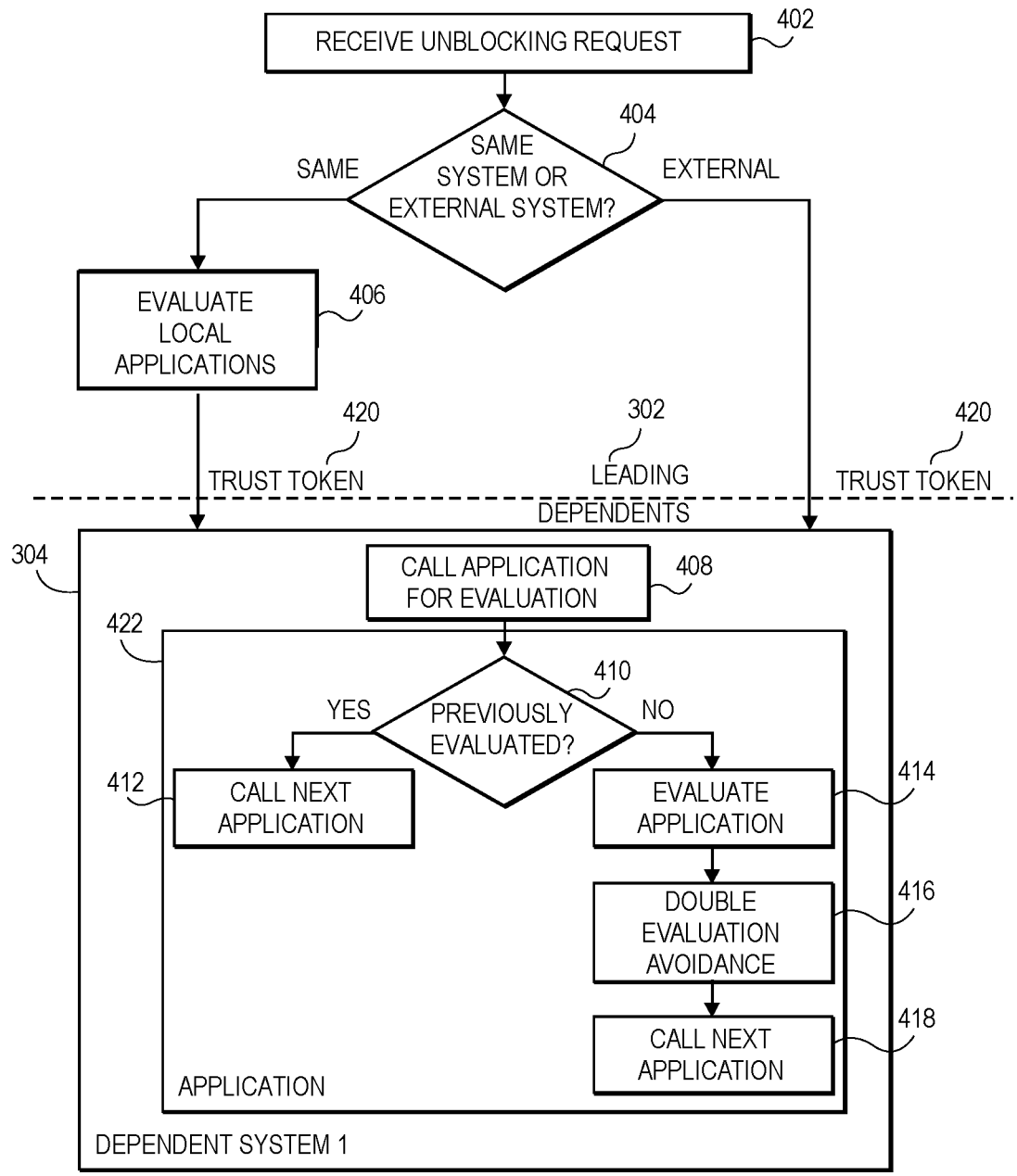
FIG. 4 illustrates an exemplary flow chart for data unblocking for determining a unique unblocking path for some embodiments.

FIG. 4 illustrates an exemplary method 400 for generating unique unblocking requests for some embodiments. A unique unblocking path may ensure a system is only contacted a single time for evaluation when performing data unblocking. As described above, systems may comprise connections to multiple leading systems 302. When performing data unblocking as described in embodiments herein, systems may be called multiple times for data unblocking. However, repeated calls and data unblocking evaluations are computationally expensive. As such, utilizing a unique unblocking path may increase data consistency and unblocking efficiency for application platforms.

At step 402, an unblocking request may be received. An unblocking report 104 may be created to generate the unblocking request. The calling system from which the unblocking request was received may be verified to be a leading system 302 as described above with respect to FIG. 2. Next, at step 404, it may be determined whether the unblocking request is for the same system or for an external system. If the unblocking request is for the same system, processing may proceed to step 406. If the unblocking request is for an external system, processing may proceed to step 408.

For unblocking in the same system, at step 406, the local applications of the system may be evaluated. In some embodiments, evaluation of applications comprises performing unblocking check 108 thereon to determine if the end of purpose has expired. Thereafter, processing may proceed to step 408. Further, a trust token 420 may be passed from the leading system 302 to the dependent system 304. As described above, each application in a system may be evaluated for unblocking.

For an external system, processing may proceed from step 404 to step 408. As depicted, the external system may be a dependent system 304. As such, a trust token 420 may be transmitted to dependent system 304. At step 408, dependent system 304 may call an application 422 for evaluation. Thereafter, at step 410, it may be determined whether the application 422 has already been evaluated. If the application 422 has already been evaluated, at step 412, the next application may be called for evaluation to prevent evaluating applications multiple times.

If the application 422 has not been evaluated, at step 414, application 422 may be evaluated. Thereafter, at step 416, double evaluation avoidance may be performed. Double evaluation avoidance may comprise registering and storing a path of unblocking. The path of unblocking may indicate from which system (i.e., which master data entity) unblocking was triggered for a specific application 422. Thereafter, if the same application is called a second time, this call may be prevented by evaluating the path to avoid multiple evaluations of a single application 422. As such, increased computational efficiency may be realized by preventing repetitive unblocking calls. Subsequently, at step 418, the next application 422 may be called for unblocking evaluation and processing may proceed back to step 410.

Figure 5:
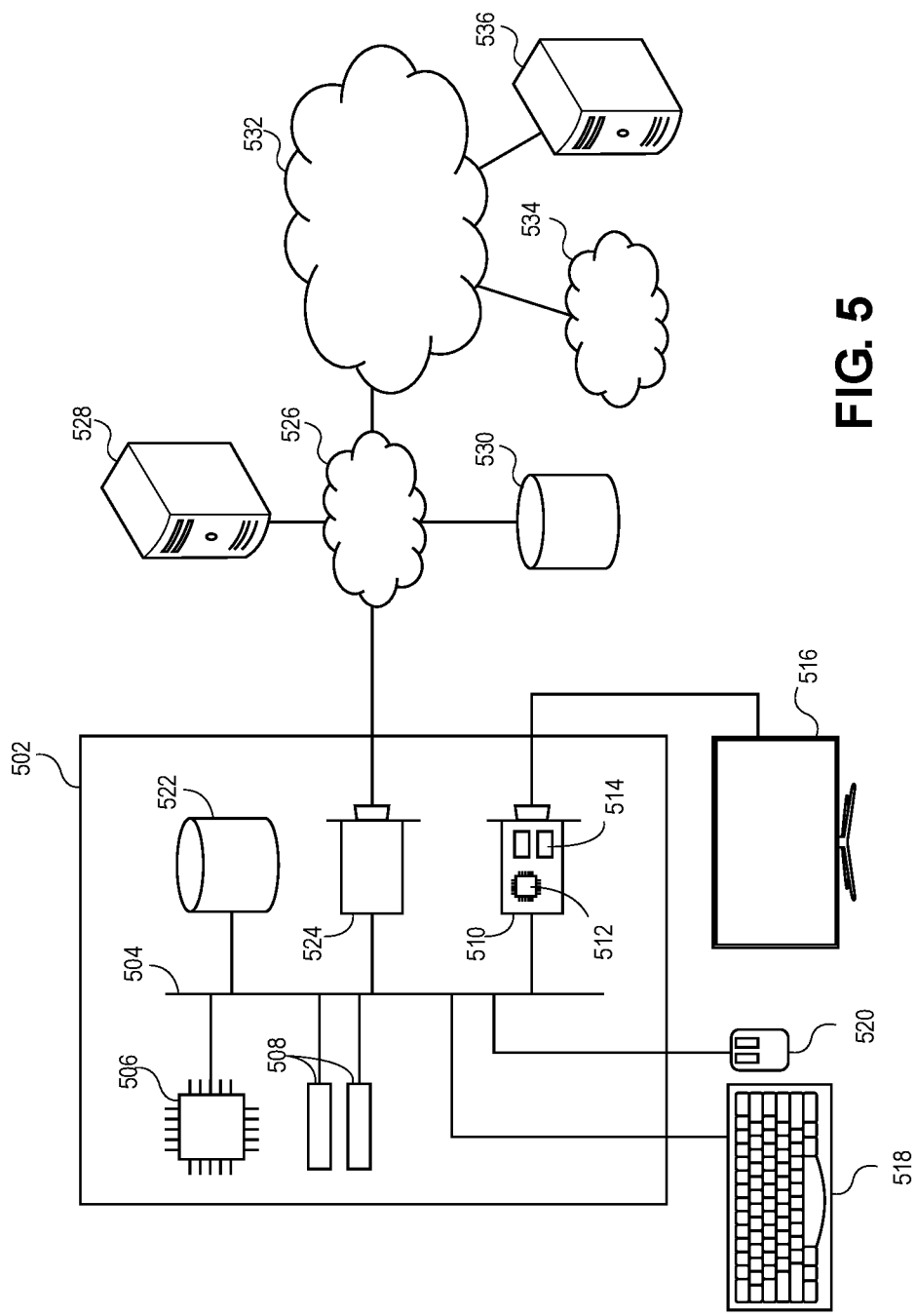
FIG. 5 depicts an exemplary hardware platform for certain embodiments.

Turning now to FIG. 5, in which an exemplary hardware platform for certain embodiments is depicted. Computer 502 can be a desktop computer, a laptop computer, a server computer, a mobile device such as a smartphone or tablet, or any other form factor of general- or special-purpose computing device containing at least one processor. Depicted with computer 502 are several components, for illustrative purposes. In some embodiments, certain components may be arranged differently or absent. Additional components may also be present. Included in computer 502 is system bus 504, via which other components of computer 502 can communicate with each other. In certain embodiments, there may be multiple buses or components may communicate with each other directly. Connected to system bus 504 is central processing unit (CPU) 506. Also attached to system bus 504 are one or more random-access memory (RAM) modules 508. Also attached to system bus 504 is graphics card 510. In some embodiments, graphics card 510 may not be a physically separate card, but rather may be integrated into the motherboard or the CPU 506. In some embodiments, graphics card 510 has a separate graphics-processing unit (GPU) 512, which can be used for graphics processing or for general purpose computing (GPGPU). Also, on graphics card 510 is GPU memory 514. Connected (directly or indirectly) to graphics card 510 is display 516 for user interaction. In some embodiments no display is present, while in others it is integrated into computer 502. Similarly, peripherals such as keyboard 518 and mouse 520 are connected to system bus 504. Like display 516, these peripherals may be integrated into computer 502 or absent. Also connected to system bus 504 is local storage 522, which may be any form of computer-readable media, such as non-transitory computer readable media, and may be internally installed in computer 502 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 524 is also attached to system bus 504 and allows computer 502 to communicate over a network such as network 526. NIC 524 can be any form of network interface known in the art, such as Ethernet, ATM, fiber, Bluetooth, or Wi-Fi (i.e., the Institute of Electrical and Electronics Engineers (IEEE) 802.11 family of standards). NIC 524 connects computer 502 to local network 526, which may also include one or more other computers, such as computer 528, and network storage, such as data store 530. Generally, a data store such as data store 530 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write, and seek operations, or any level of complexity in between. Some data stores may additionally provide management functions for data sets stored therein such as backup or versioning. Data stores can be local to a single computer such as computer 528, accessible on a local network such as local network 526, or remotely accessible over public Internet 532. Local network 526 is in turn connected to public Internet 532, which connects many networks such as local network 526, remote network 534 or directly attached computers such as computer 536. In some embodiments, computer 502 can itself be directly connected to public Internet 532.

Many different arrangements of the various components depicted, as well as components not shown, are possible without departing from the scope of the claims below. Embodiments have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the present teachings have been described with reference to the embodiments illustrated in the attached drawing figures, it is noted that equivalents may be employed and substitutions made herein without departing from the scope of the claims.

Having thus described various embodiments, what is claimed as new and desired to be protected by Letters Patent includes the following:

1. One or more non-transitory computer-readable media storing computer-executable instructions that, when executed by a processor, perform a method for unblocking data in application platforms, comprising:
   receiving, from a user, an unblocking request to unblock data for at least one system of a plurality of systems in an application platform,
   wherein the plurality of systems includes a leading system containing an original version of an electronic master data entity and one or more dependent systems containing replications of the electronic master data entity;
   responsive to receiving the unblocking request, determining a calling system associated with the unblocking request; and
   responsive to determining the calling system is a leading system as opposed to a dependent system of the at least one system, verifying the leading system with a trust token and triggering unblocking for the leading system and all of the one or more dependent systems containing replications of the electronic master data entity,
   wherein triggering unblocking comprises a resetting of a blocking flag indicative that data for the at least one system is unusable for processing.

2. The media of claim 1, wherein the method further comprises responsive to determining the calling system is one of the one or more dependent systems containing replications of the electronic master data entity, preventing unblocking of the data.

3. The media of claim 1, wherein the method further comprises:
   transmitting, from the leading system to the at least one dependent system, a trust token,
   wherein the trust token comprises an identifier for the leading system.

4. The media of claim 3, wherein the method further comprises:
   receiving, from the calling system and at the one or more dependent systems, a triggering signal for unblocking; and
   responsive to receiving the triggering signal, verifying the calling system using the trust token.

5. The media of claim 1,
   wherein the plurality of systems is organized as a hierarchy, and
   wherein the method further comprises:
   automatically generating a chain of unblocking requests from the leading system to all systems in the hierarchy.

6. The media of claim 1, wherein the method further comprises:
   responsive to triggering unblocking, calling a dependent system of the leading system;
   determining if the dependent system has been evaluated for unblocking; and
   responsive to determining the dependent system has been evaluated for unblocking, preventing a repeat unblocking evaluation of the dependent system.

7. A method for data unblocking in application platforms, the method comprising:
   receiving, from a user, an unblocking request to unblock data for at least one system of a plurality of systems in an application platform,
   wherein the plurality of systems includes a leading system containing an original version of an electronic master data entity and one or more dependent systems containing replications of the electronic master data entity;
   responsive to receiving the unblocking request, determining a calling system associated with the unblocking request; and
   responsive to determining the calling system is a leading system as opposed to a dependent system of the at least one system, verifying the leading system with a trust token and triggering unblocking for the leading system and all of the one or more dependent systems containing replications of the electronic master data entity,
   wherein triggering unblocking comprises a resetting of a blocking flag indicative that data for the at least one system is unusable for processing.

8. The method of claim 7,
   wherein the plurality of systems is organized in a hierarchy, and
   wherein the method further comprises triggering, from the leading system, unblocking to the plurality of systems in the hierarchy.

9. The method of claim 7,
   wherein the at least one system is a dependent system, and wherein the method further comprises:
receiving, at the dependent system and from the calling system, a call for unblocking; and
responsive to receiving the call for unblocking, determining if the dependent system has already been evaluated for unblocking.

10. The method of claim 9, wherein the method further comprises:
responsive to determining the dependent system has already been evaluated for unblocking, preventing a repeat unblocking evaluation of the dependent system; and
responsive to determining the dependent system has not been evaluated for unblocking, evaluating the dependent system for unblocking.

11. The method of claim 10, wherein the method further comprises:
further responsive to determining the dependent system has not been evaluated for unblocking, registering, for the dependent system, a path to unblocking,
wherein the path to unblocking comprises an identifier for the calling system.

12. The method of claim 7, wherein the method further comprises responsive to determining the calling system is a dependent system, preventing unblocking for the at least one system.

13. A system for data unblocking in application platforms, comprising:
a data store;
a processor; and
one or more non-transitory computer-readable media storing computer-executable instructions that, when executed by the processor, perform a method for data unblocking in application platforms, comprising:
receiving, from a user, an unblocking request to unblock data for at least one system of a plurality of systems in an application platform,
wherein the plurality of systems includes a leading system containing an original version of an electronic master data entity and one or more dependent systems containing replications of the electronic master data entity;
responsive to receiving the unblocking request, determining a calling system associated with the unblocking request; and
responsive to determining the calling system is a leading system as opposed to a dependent system of the at least one system, verifying the leading system with a trust token and triggering unblocking for the leading system and all of the one or more dependent systems containing replications of the electronic master data entity,
wherein triggering unblocking comprises a resetting of a blocking flag indicative that data for the at least one system is unusable for processing.

14. The system of claim 13, wherein the method further comprises:
receiving, from the user, at least one rule for grouping the electronic master data entity to the at least one system group,
wherein the at least one rule comprises an attribute defining the at least one electronic master data entity as the leading system for the at least one system group.

15. The system of claim 13,
wherein the plurality of systems is organized as a hierarchy, and
wherein the method further comprises:
automatically generating a chain of unblocking requests from the leading system to the plurality of systems in the hierarchy; and
responsive to determining a system of the plurality of systems cannot be unblocked, rolling back unblocking for all systems in the hierarchy.

16. The system of claim 13,
wherein the leading system comprises at least one dependent system,
wherein the at least one dependent system comprises a data replication of the leading system.

17. The system of claim 13, wherein the method further comprises responsive to determining the calling system is a dependent system, preventing unblocking for the at least one system.

* * * * *